United States Patent [19]
Kachler

[11] 3,724,905
[45] Apr. 3, 1973

[54] WHEEL COVER ASSEMBLY

[76] Inventor: Robert S. Kachler, 1047 Pine Avenue, Long Beach, Calif. 90813

[22] Filed: Feb. 19, 1971

[21] Appl. No.: 116,902

[52] U.S. Cl. .............................. 301/37 P, 301/37 S
[51] Int. Cl. ............................................. B60b 7/06
[58] Field of Search ............. 301/37 S, 37 P, 108 TW

[56] References Cited

UNITED STATES PATENTS

| | | | |
|---|---|---|---|
| 3,528,705 | 9/1970 | Oldroyd | 301/37 P |
| 3,114,579 | 12/1963 | Isenbarger | 301/108 TW |
| 2,902,316 | 9/1959 | Black | 301/37 S |
| 2,947,572 | 8/1960 | Lyon | 301/37 S |
| 3,397,918 | 8/1968 | Aske | 301/37 P |

Primary Examiner—Richard J. Johnson
Attorney—Fulwider, Patton, Rieber, Lee & Utecht

[57] ABSTRACT

A wheel cover assembly for mounting to a wheel structure of the type which includes a tire rim which circumscribes the central lug nut area of the wheel. The wheel assembly includes a flat circular wheel cover made of transparent plastic material which overlies the central lug nut area of the wheel and affords a means for inspection of the lug nut area, the wheel cover being removably secured in position by cooperating fastener and mounting means. The transparent wheel cover is particularly suited for use with sculptured or decorative aluminum alloy or magnesium wheels, and the wheel cover may be tinted to further enhance the decorative appearance of the wheel.

3 Claims, 5 Drawing Figures

PATENTED APR 3 1973　　　　　　　　　　　　　　3,724,905
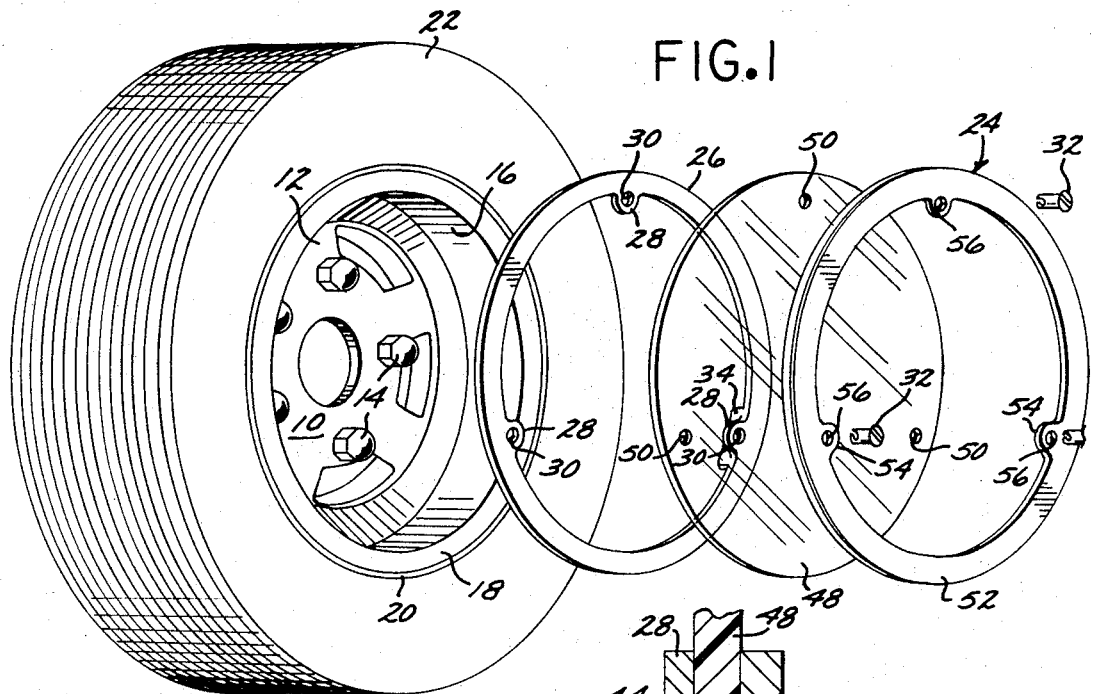
FIG.1
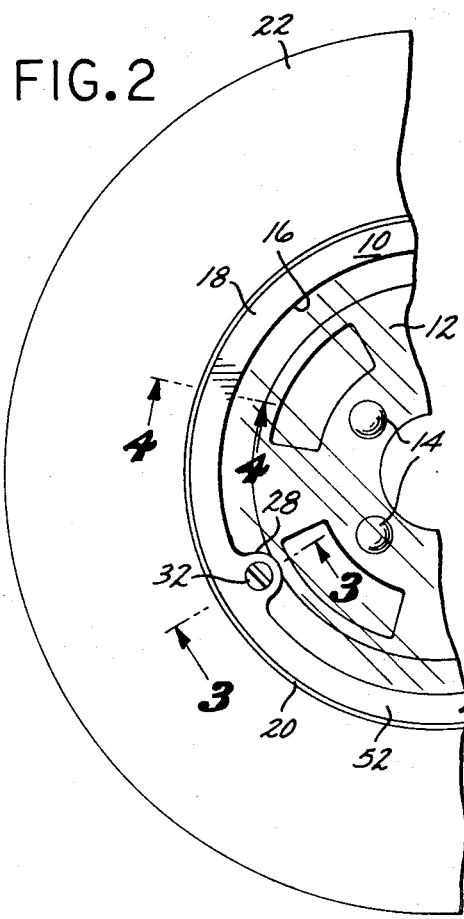
FIG.2
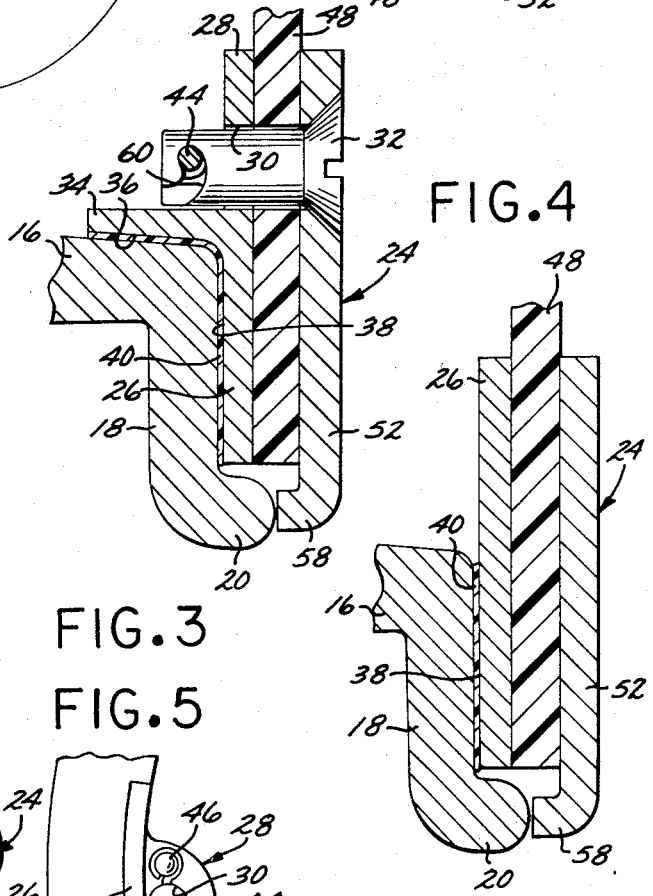
FIG.3
FIG.4
FIG.5
INVENTOR.
ROBERT S. KACHLER
BY Fulwider, Patton, Rieber,
Lee and Utecht
ATTORNEYS

WHEEL COVER ASSEMBLY

BACKGROUND OF THE INVENTION

1. Field of the Invention:

The present invention relates to a wheel cover assembly, and more particularly to a wheel cover assembly having a transparent wheel cover adapted to overlie the central lug nut area of a vehicle wheel.

2. Description of the Prior Art:

For many years the somewhat utilitarian lug nut and axle hub area of vehicle wheels has been decoratively concealed by wheel covers of various ornamental configurations. The periphery of such a wheel cover is most commonly arranged to frictionally engage the wheel rim flange to removably secure the cover in position.

It is currently popular with automobile enthusiasts to dispense with the usual wheels and wheel covers and instead use aluminum alloy or magnesium wheels having decorative, sculptured configurations molded in or die cast as an integral part of the wheel. Since no wheel cover is customarily employed with such a wheel its use is marred by susceptibility to dirt and dust, and poor air flow characteristics past the wheel, which is particularly apparent to dragsters and similar racing enthusiasts who utilize such wheels on their vehicles. The air flow pattern across the deep-dish shape of the usual magnesium wheel presents a drag which significantly reduces the speed of the vehicle.

SUMMARY

According to the present invention a wheel cover assembly is provided which is adapted for mounting to a vehicle wheel structure which includes a tire rim circumscribing the central lug nut area of the wheel. The wheel cover assembly includes a mounting means which is preferably adhesively secured to the tire rim so as not to mar or spoil the polished surface of the relatively expensive wheel structure of aluminum alloy or magnesium wheels. A flat circular wheel cover of transparent material is disposed in overlying relation to the central lug nut area of the wheel and is mounted in position by fasteners which removably couple to the mounting means secured to the tire rim. The flat character of the wheel cover provides excellent optical and aerodynamic characteristics, while its transparency affords easy inspection of the lug nut area. Since the cover tends to exclude flying rocks, dust, dirt and the like, the attractive interior of the wheel remains unmarred, all the while being visible through the transparent cover. The cover may also be tinted or colored to match or accent the color of the vehicle. In this regard, the differing angles of light incidence upon the cover present attractive, bold patterns of light and shadow, particularly where the wheel configuration is a deeply sculptured type.

Other objects and features of the invention will become apparent from consideration of the following description taken in connection with the accompanying drawing.

BRIEF DESCRIPTION OF THE DRAWING

FIG. 1 is an exploded view of a vehicle wheel and wheel cover assembly according to the present invention;

FIG. 2 is a front elevational view of the present wheel cover assembly in position upon the vehicle wheel, portions thereof being omitted for brevity;

FIG. 3 is an enlarged detail view taken along the line 3—3 of FIG. 2;

FIG. 4 is an enlarged detail view taken along the line 4—4 of FIG. 2; and

FIG. 5 is a detail view of the inner portion of one of the fasteners and fastener mounts.

DESCRIPTION OF THE PREFERRED EMBODIMENT

Referring now to the drawings, there is illustrated a vehicle wheel 10 having a centrally recessed wheel body 12 provided with a plurality of openings to receive the usual wheel mounting studs whereby a plurality of lug nuts 14 can be mounted upon the studs to secure the wheel 10 in position.

The wheel body 12 includes a generally axially outwardly extending tire rim 16 having a generally radially outwardly extending tire rim bead flange 18 which includes a generally outwardly directed terminal portion 20. The tire rim 16 mounts a pneumatic tire 22 in the usual manner.

The wheel 10 is preferably a die cast aluminum alloy or magnesium type in which the wheel body 12 is characterized by a decorative, highly sculptured configuration.

The present wheel cover assembly, generally designated by the numeral 24, is adapted to be mounted upon the wheel 10 in overlying relation to the central lug nut area. The assembly 24 comprises an annular inner or mounting ring 26 which is preferably made of a lightweight metal such as an aluminum alloy. The outer diameter of the ring 26 is slightly less than that of the terminal portion 20 of the rim flange 18 so that it is recessed within the portion 20.

The mounting ring 26 includes three circumferentially spaced locating portions or fastener mounts 28 which are integral with the ring 26 and which are each characterized by a radially inwardly extending portion having an axially oriented opening 30 for receipt of one of three fasteners 32. Adjacent each fastener mount 28 the ring 26 is also provided with an axially and inwardly extending portion 34 having a radially outwardly located face 36 adapted to fit against the radially inwardly located face of the wheel rim 16. The radially extending faces 36 merge with the circumferentially oriented inner face 38 of the mounting ring main body. Each of the faces 36 is secured to the rim 16 and rim flange 18, preferably by a layer 40 of adhesive of a type which is susceptible to the action of certain solvents so that it can readily be removed without scarring or marring the polished or satin finish of the wheel body surfaces, as will be apparent to those skilled in the art. The orientation of the faces 36 on the wheel rim 16 locates the ring 26 in proper position upon the wheel 10.

As best seen in FIGS. 3 and 5, the inner side of each mount 28 mounts a fastener anchorage or element 44 adapted to cooperate with a fastener 32. The element 44 is a resilient wire whose ends are looped and fastened to the ring 26 on opposite sides of the fastener opening 30 by a pair of usual rivets 46. The intermediate portion of the wire element 44 extends across the opening 30 and acts as a holding element or catch 46 for a fastener 32, as will be seen.

The wheel cover assembly 24 further comprises a circular flat plate or wheel cover 48 made of transparent synthetic plastic material such as high impact acrylic plastic material. Of course, other suitable substantially transparent materials having adequate strength may also be used if desired. The outer circumference of the cover 48 is preferably the same as the outer circumference of the mounting ring 26 so as to generally lie within the rim terminal portion 20 and also overlie the mounting ring 26. In addition, the cover 48 includes three openings 50 aligned with the openings 30 in the mounting ring 26 to receive the fasteners 32.

The cover assembly 24 also includes an outer ring or mounting bezel 52 which is preferably made of a lightweight material such as aluminum. The bezel 52 includes arcuate portions 54 identical to the mounts 28 of the mounting ring 26, each of the portions 54 including an opening 56 for alignment with the corresponding openings 50 and 30 of the cover 48 and ring 26 to receive the fasteners 32.

The outer circumference of the bezel 52 is greater than that of the cover 48 and ring 26, including an axially inwardly turned terminal portion 58 which overlies the terminal portion 20 of the tire rim 16. Their confronting faces are illustrated in spaced relation in FIG. 3, but the space between them could be closed, if desired, by a sealing ring of rubber or other resilient material (not shown). Such a sealing ring could be adhesively secured to the inner face of the terminal portion 58 so that it would be compressed upon mounting of the cover assembly 24 to the wheel 10. This would tend to close off the interior of the wheel against most dust and dirt.

The openings 56 in the bezel 52 are preferably countersunk to accept fasteners 32 having conical slotted heads, providing a flush relation of the fastener heads with the outer surface of the bezel 52.

Although various fastening means could be utilized to readily removably secure the wheel cover 48 to the wheel 10, the fasteners 32 preferred for this purpose are known in the trade as Dzns fasteners. Each such fastener 32 thus includes a shank whose inner extremity is characterized by a generally spirally disposed slot 60 operative upon rotation of the fastener 32 in one direction to engage the wire element 44 and move the fastener axially inwardly against the cover assembly 24. Conversely, rotation in the opposite direction tends to rotate the fastener 32 axially outwardly and eventually out of engagement with the wire element 44. The resilience of the wire element 44 is such that, upon seating of the wire within the innermost terminus of the slot 60, the bias of the wire tends to retain the fastener 32 in position. Consequently, fasteners 32 of this type are removable only upon deliberate rotation. Accidental dislodgement is rendered extremely unlikely.

The readily removable character of the fasteners 32 permits the wheel cover 48 to be quickly removed to dismount the wheel for checking tire pressure, tightness of lug nuts, or the like. However, with the fasteners 32 in position the wheel cover 48 is securely held in position and protects the central lug nut area from dirt, dust, and flying rocks, while also affording a means for constant visual inspection of the decorative interior of the wheel. The substantial flatness of the wheel cover 48 also reduces the drag which would otherwise be produced by the turbulent air flow into and about the deeply dished interior of the lug nut area.

The plastic material of the wheel cover 48 can be colored or tinted as desired so as to match or accent the color of the vehicle upon which the wheel 10 is mounted. In addition, it has been found that light falling upon the surface of the wheel cover 48 at the various angles of incidence produces very interesting and attractive patterns of shadow and light which has the effect of enhancing the ornamental configuration of the wheel 10 as seen through the transparent wheel cover 48.

Various modifications and changes may be made with regard to the foregoing detailed description without departing from the spirit of the invention.

I claim:

1. A wheel cover assembly for mounting to a wheel structure including a tire rim circumscribing the central lug nut area of the wheel, said wheel cover assembly comprising:

mounting means including a mounting ring having a plurality of fastener mounts for adhesive attachment to the tire rim in circumferentially spaced relation, each of said fastener mounts including a resilient element;

a substantially flat circular wheel cover of transparent plastic material overlying said mounting means;

a retaining bezel overlying said wheel cover; and a plurality of fasteners disposed through said bezel and coupled to said fastener mounts in engagement with said resilient elements for removably securing said wheel cover in position whereby the central lug nut area of the wheel is visible from the exterior and the resilience of said resilient elements tends to maintain said engagement.

2. In combination with a wheel structure including a tire rim circumscribing the central lug nut area of the wheel, a wheel cover assembly comprising:

mounting means including a mounting ring having a plurality of fastener mounts adhesively attached to the tire rim in circumferentially spaced relation, each of said fastener mounts including a resilient element;

a substantially flat circular wheel cover of transparent plastic material overlying said mounting means;

a retaining bezel overlying said wheel cover; and a plurality of fasteners disposed through said bezel and coupled to said fastener mounts in engagement with said resilient elements and removably securing said wheel cover in position whereby the central lug nut area of the wheel is visible from the exterior and the resilience of said resilient elements tends to maintain said engagement.

3. In combination with a wheel structure including a tire rim terminating in a tire rim bead flange circumscribing and defining the circumferential outer boundary of the tire rim and encompassing the central lug nut area of the wheel, a wheel cover assembly comprising:

a mounting ring secured to said wheel;

a circular wheel cover of transparent plastic material overlying and covering said tire rim and said central lug nut area, said wheel cover being flat for optical clarity whereby said central lug nut area may clearly be viewed through said wheel cover, and the periphery of said wheel cover overlying said tire rim bead flange whereby airflow across the flat area of said wheel cover and radially outwardly across said tire rim bead flange is characterized by relatively low drag; and fastener means removably securing said wheel cover to said mounting ring.

* * * * *